(12) United States Patent
Komatsu et al.

(10) Patent No.: US 7,232,005 B2
(45) Date of Patent: Jun. 19, 2007

(54) POWER PLANT MOUNTING APPARATUS (75) Inventors: Junji Komatsu, Aichi (JP); Eiki Matsuda, Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 385 days.

(21) Appl. No.: 10/700,665

(22) Filed: Nov. 5, 2003

(65) Prior Publication Data

US 2004/0124034 A1 Jul. 1, 2004

(30) Foreign Application Priority Data

| Nov. 7, 2002 | (JP) | P 2002-323218 |
| Nov. 7, 2002 | (JP) | P 2002-323220 |
| Nov. 7, 2002 | (JP) | P 2002-323221 |

(51) Int. Cl.
*B50K 5/00* (2006.01)

(52) U.S. Cl. .............. 180/299; 248/638; 267/141.2; 267/293; 280/788

(58) Field of Classification Search ........... 180/312, 180/300, 291, 291 XM, 299; 280/781, 788; 267/141.2, 293
See application file for complete search history.

(56) References Cited

U.S. PATENT DOCUMENTS

| 1,578,673 | A | | 3/1926 | Masury et al. |
| 1,778,503 | A | * | 10/1930 | Lord .................. 267/141.2 |
| 1,828,278 | A | | 10/1931 | Breer |
| 4,031,978 | A | * | 6/1977 | Taylor .................. 180/232 |
| 4,395,980 | A | * | 8/1983 | Tominaga et al. ...... 123/90.27 |
| 4,564,082 | A | | 1/1986 | Takehara et al. |
| 4,617,212 | A | * | 10/1986 | Kuan .................. 428/35.9 |
| 5,178,230 | A | | 1/1993 | Goor |
| 5,899,498 | A | * | 5/1999 | Horton .................. 280/781 |
| 6,105,548 | A | * | 8/2000 | Carlson et al. ......... 123/195 A |
| 6,575,440 | B2 | * | 6/2003 | Bean .................. 267/141.2 |
| 6,877,710 | B2 | * | 4/2005 | Miyahara et al. ........... 248/637 |
| 6,997,276 | B2 | * | 2/2006 | Yoshida et al. ............. 180/232 |
| 2001/0016986 | A1 | * | 8/2001 | Bean .................. 29/898.07 |
| 2002/0144852 | A1 | * | 10/2002 | Shimizu et al. ............. 180/300 |

FOREIGN PATENT DOCUMENTS

| BE | 366 754 A | 2/1930 |
| DE | 766 585 C | 11/1951 |
| GB | 494 362 A | 10/1938 |
| GB | 2 126 546 A | 3/1984 |
| JP | 9-240291 A | 9/1997 |
| JP | 2000-120770 A | 4/2000 |
| NL | 121 798 C | 9/1966 |
| WO | WO 00/26052 A | 5/2000 |

* cited by examiner

*Primary Examiner*—Paul N. Dickson
*Assistant Examiner*—Leonard McCreary, Jr.
(74) *Attorney, Agent, or Firm*—Birch, Stewart, Kolasch & Birch, LLP (57) ABSTRACT

A power plant mounting apparatus includes a mount member that enables a side member of a vehicle to support a power plant. The mount member has a supporting member whose one end is fixed to the power plant. The supporting member has a shaft portion at the other end thereof which is disposed within an outer tube. An insulator is provided between the shaft portion and the outer tube. A bracket of a flat plate-shape attached to the outer tube is fastened to an inner side surface of the side member by means of a bolt. A center point of the shaft portion within the outer tube is positioned within the side member.

21 Claims, 7 Drawing Sheets

PRIOR ART

FIG. 7

PRIOR ART

FIG. 8

PRIOR ART

FIG. 9

FORWARD DIRECTION

FIG. 10

POWER PLANT MOUNTING APPARATUS

This Nonprovisional application claims priority under 35 U.S.C. 119(a) on Patent Application No(s). 2002-323218; 2002-323220 and 2002-323221 filed in JAPAN on Nov. 7, 2002, the entire contents of which are hereby incorporated by reference.

BACKGROUND OF THE INVENTION

1. Field of the Invention

The present invention relates to an apparatus for elastically supporting a power plant by a vehicle frame member such as a side member of a vehicle.

2. Description of the Related Art

Figure 7:
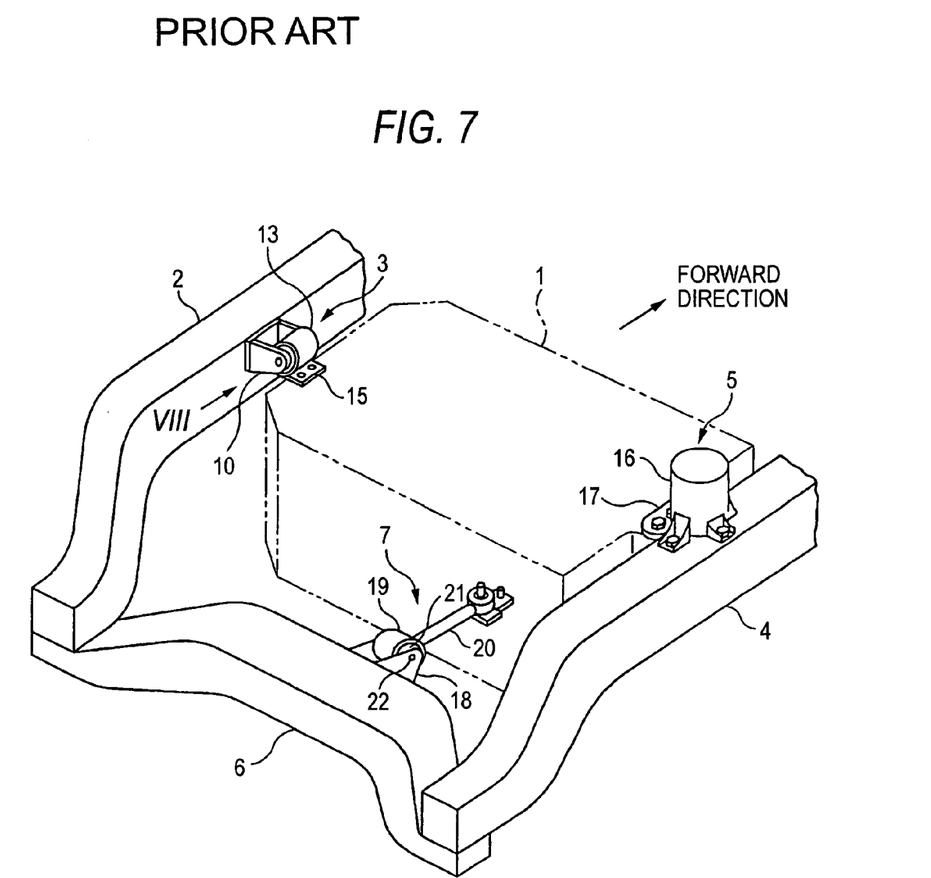
FIG. 7 is a schematic diagram showing a conventional apparatus.
Figure 8:
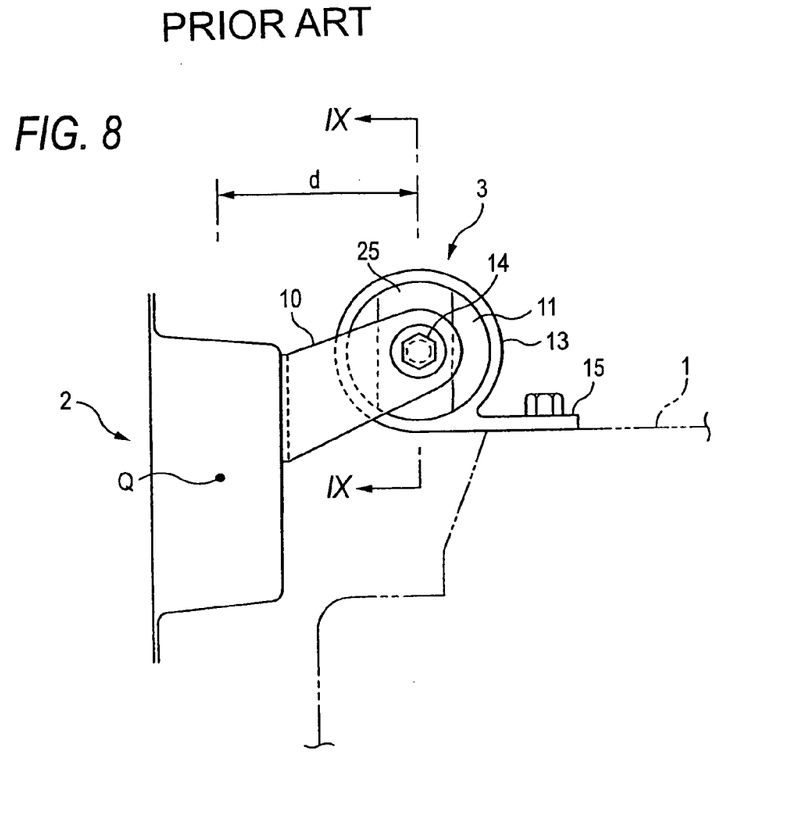
FIG. 8 is an enlarged diagram seen from a direction shown by an arrow VIII in FIG. 7.
Figure 9:
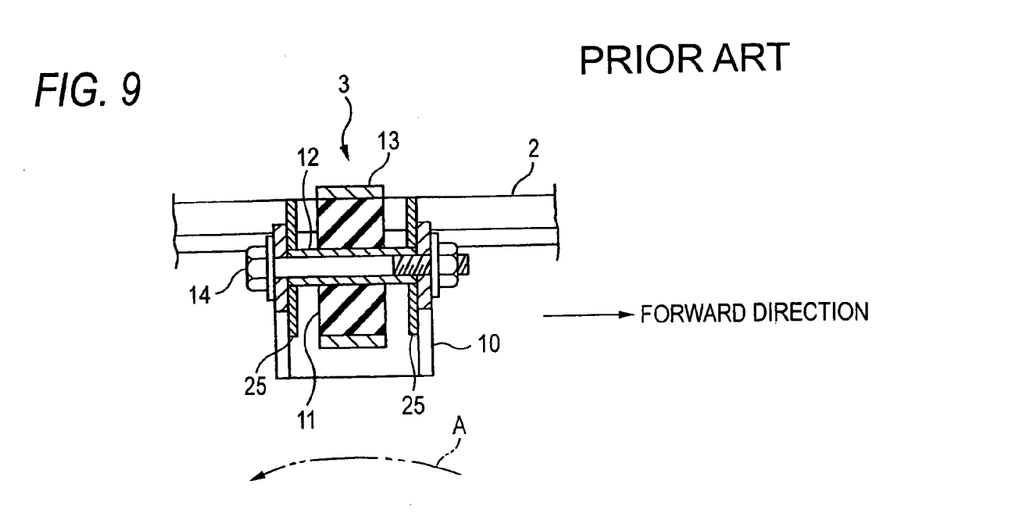
FIG. 9 is a sectional view taken along line IX—IX FIG. 8.

As shown in FIGS. 7 to 9, the conventional power plant mounting apparatus for a vehicle is configured in a manner that a power plant 1, in which an engine and a transmission are integrally coupled to each other and laid horizontally, is supported on a vehicle body at three points, that is, at a mount member 3, at a mount member 5 and at a roll rod mount member 7. The power plant mounting apparatus is configured by the mount member 3 provided between the upper portion of the power plant 1 and a left side member 2 which extends in the longitudinal direction of the vehicle and has a closed section, the mount member 5 provided between the upper portion of the power plant 1 and a right side member 4 which extends in the longitudinal direction of the vehicle and has a closed section, and the roll rod mount member 7 provided so as to straddle between the lower portion of the power plant 1 and a chassis cross member 6 extending in a direction perpendicular to the longitudinal direction of the vehicle, that is, a vehicle width direction.

The mount member 3 includes a mount bracket 10 having an almost U-shaped section. A bottom portion of the mount bracket 10 is fixed to an inner side surface of the left side member 2. Both tip ends of the mount bracket 10 protrude in the vehicle width direction. The mount member 3 further includes an inner tube 12 and an outer tube 13 between which an insulator 11 formed by rubber-like elastic member is provided, and a bolt 14 having both ends that are respectively engaged with the both tip ends of the mount bracket 10 in a state that the bolt penetrates through the inner tube 12 and extends in the longitudinal direction of the vehicle. An arm 15 of the outer tube 13 is secured to the upper portion of the power plant 1 by means of bolts.

The mount member 5 is configured by a not-shown inner tube and an outer tube 16 between which an insulator formed by rubber-like elastic member is provided, and a not-shown bolt which is fixed to the upper portion of the power plant 1 via an arm 17 in a state that the bolt penetrates through the inner tube and extends vertically. The outer tube 16 is secured to the upper portion of the right side member 4 by means of a bolt.

The roll rod mount member 7 includes a two-branched mount bracket 18 fixed to the chassis cross member 6. Both tip ends of the bracket 18 protrude in the forward direction of the vehicle. The roll rod mount member 7 further includes a rod 20 one end of which is coupled to the bottom portion of the power plant 1 and the other end of which is integrally formed with an outer tube 19, an insulator 21 formed by rubber-like elastic member and provided between a not-shown inner tube and the outer tube 19, and a bolt 22 having both ends that are respectively engaged with the both tip ends of the mount bracket 18 in a state that the bolt penetrates through the inner tube and extends in the vehicle width direction. The power plant 1 is pivotally supported at three points on the vehicle body by means of the mount member 3, the mount member 5 and the roll rod mount member 7.

However, in the mount member 3, the shaft center of the bolt 14, which acts as the point of action of a load at the time of transmitting a vibratory force of the power plant 1 and an inertial force of the power plant 1 caused by accelerating or decelerating the running of the vehicle or by the steering operation and transmitted from the power plant 1 side to the left side member 2 side, is made largely offset by a distance d in the vehicle width direction from the sectional center point Q of the left side member 2. Thus, the supporting rigidity of the mount member 3 for supporting the power plant 1 is degraded, and the vibration damping characteristics of the mount member 3 is not enough. Since a relatively large space is required between the power plant 1 and the left side member 2, a position for disposing the mount member 3 within the engine compartment that is already narrow may be limited.

Also, at the time of rapid acceleration of a vehicle, a roll input force as a reaction force of the wheels acts on the power plant 1 as shown by an arrow A in FIG. 9. The mount member 3 provided at the upper portion of the power plant 1 has a low rigidity along the axial direction (the longitudinal direction of the vehicle). Since a load is applied to the mount member 3 along the axial direction, it is difficult for the mount member 3 to surely support the roll input force. Further, the mount member 3 is required to be provided with stoppers 25, 25 formed by rubber-like elastic member in order to prevent the outer tube 13 from making metal-contact with the tip portion of the mount bracket 10, when the outer tube 13 of the mount member 3 inclines in the longitudinal direction of the vehicle due to the elastic deformation of the insulator 11 caused by the roll input force, etc.

Further, at the time of rapid deceleration of a vehicle, a roll input force directed in the direction opposite to the arrow A in FIG. 9 acts on the power plant 1 so that a disadvantage similar to that of the aforesaid case arises.

Furthermore, in order to make the mount member 3 effectively reduce the vibration and noise caused by the operation of the plant 1, the fixing position of the mount member 3 with respect to the left side member 2 is required to be set at the most suitable position for each kind of the power plant 1. Thus, it is required to prepare many kinds of the left side members 2 in each of which the fixing position of the mount member 3 is suitably changed in accordance with the kind of the power plant 1.

Incidentally, power plant mounting apparatuses described in JP-A-2000-120770 and JP-A-9-240291 are conventionally known.

SUMMARY OF THE INVENTION

The present invention has been made to solve the above problems, and therefore one object of the invention is to provide a power plant mounting structure in which a vehicle frame member elastically supports a power plant and in which an offset distance between a vehicle frame member and a point of action of a load transmitted from the power plant side to the vehicle frame member side is reduced.

Another object of the invention is to provide a power plant mounting structure which occupies a small space and which surely supports a roll input force acting on a power plant.

Still another object of the invention is to provide a power plant mounting structure in which an attachment position of a mount member with respect to a side member of a vehicle can be easily changed.

According to a first aspect of the invention, there is provided a power plant mounting apparatus including: a vehicle frame member constituting a vehicle frame; a mount member having an elastic member and connecting a power plant and the vehicle frame member; wherein at least a part of the mount member is positioned inside the vehicle frame member; and a load applied to the vehicle frame member from the power plant is transmitted through the elastic member.

Also, the vehicle frame member may have a side member extending in a longitudinal direction of a vehicle, the mount member may include a shaft portion and an outer tube between which the elastic member is disposed in an annular manner, and a shaft center of each of the shaft portion and the outer tube may extend in a vehicle width direction.

Further, the vehicle frame member may have a side member extending in a longitudinal direction of a vehicle, the mount member may include a shaft portion coupled to the power plant and an outer tube between which the elastic member is disposed in an annular manner, a flange portion fixed to the outer tube may have a long hole, and the flange portion may be fixed to the side member by a bolt penetrating through the long hole.

DETAILED DESCRIPTION OF THE INVENTION

A first embodiment of the invention will be described with reference to FIGS. 1 and 2. In these Figures, members and portions, which are the same as those in the conventional apparatus, are denoted by the same reference numerals.

Figure 1:
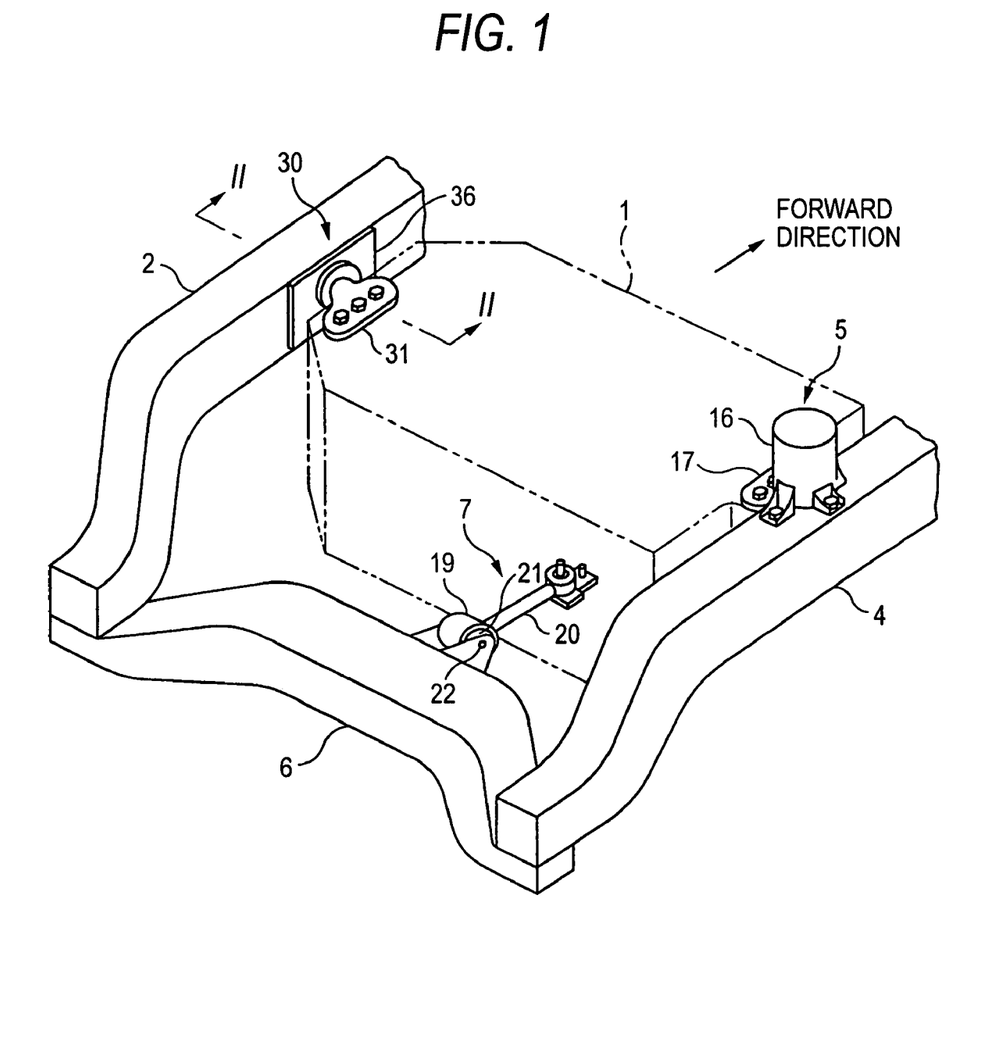
FIG. 1 is a schematic diagram showing a first embodiment of the present invention.
Figure 2:
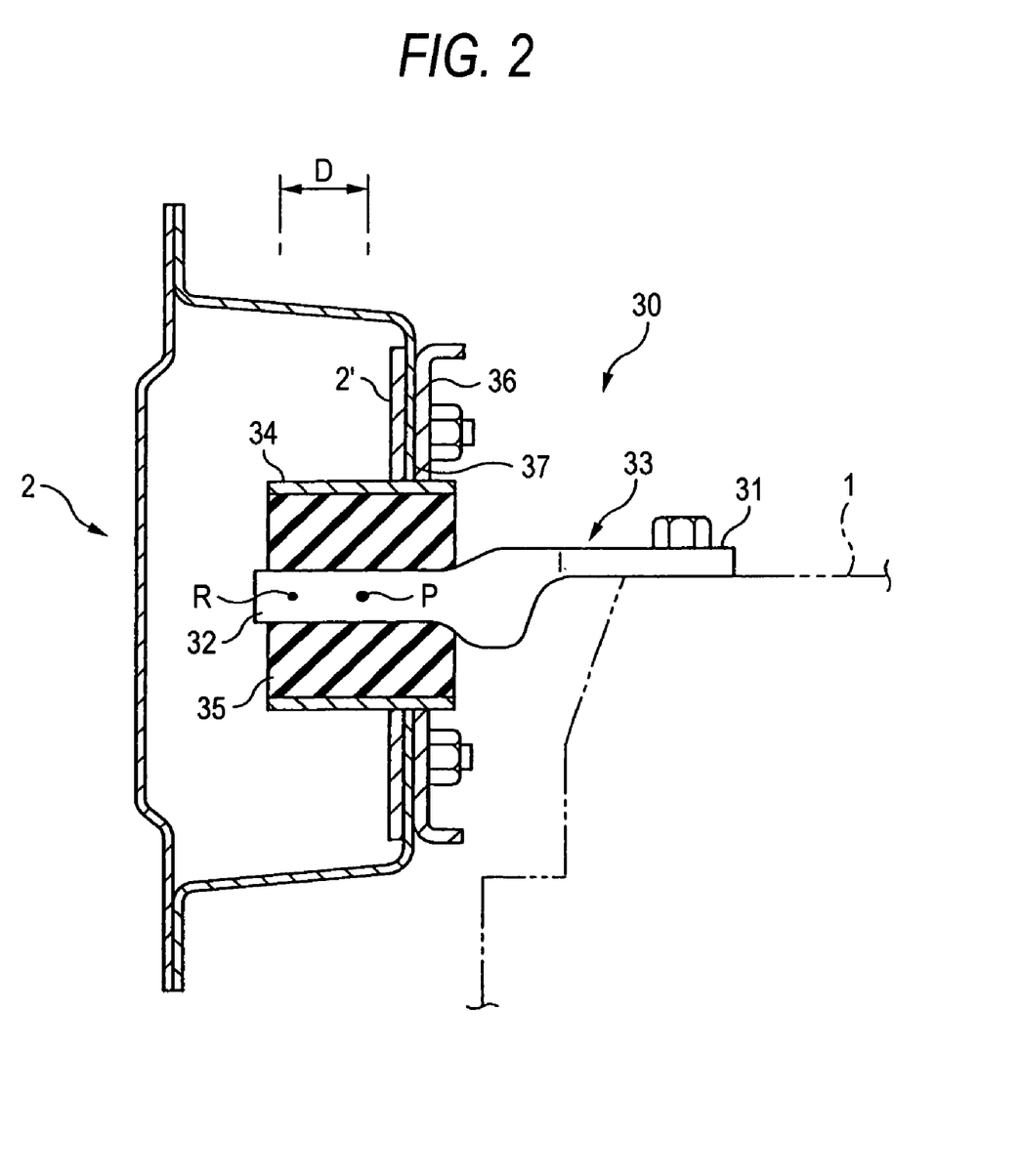
FIG. 2 is a sectional view taken along line II—II in FIG. 1.

FIGS. 1 and 2 show a power plant mounting apparatus for a vehicle according to a first embodiment of the invention. The power plant mounting apparatus is configured in a manner that a power plant 1, in which an engine and a transmission are integrally coupled to each other and laid horizontally, is supported on a vehicle body at three points, that is, at a mount member 30, at a mount member 5 and at a roll rod mount member 7. The power plant mounting apparatus includes the mount member 30 provided between the upper portion of the power plant 1 and a left side member 2 which extends in the longitudinal direction of the vehicle and has a closed section, the mount member 5 provided between the upper portion of the power plant 1 and a right side member 4 which extends in the longitudinal direction of the vehicle and has a closed section, and the roll rod mount member 7 provided so as to straddle between the lower portion of the power plant 1 and a chassis cross member 6 extending at the rear side portion of the vehicle in a direction perpendicular to the longitudinal direction of the vehicle, that is, a vehicle width direction.

Each of the left and right side members 2 and 4 has a cross section of a closed section. The closed section may be a rectangular shape, circular shape, elliptic shape or other shape made of a closed curve. The closed section is made of a closed curve having no cut out portion.

The mount member 30 includes a supporting member 33 having a flange 31 and a shaft portion 32 extending in the vehicle width direction, an outer tube 34 for surrounding the outer periphery of the shaft portion 32, an insulator 35 circularly disposed between the shaft portion 32 and the outer tube 34 and formed by rubber-like elastic member, and a bracket 36 of an almost flat plate-shape at which the outer tube 34 is fixed by means such as press fitting or welding. The flange 31 of the supporting member 33 is secured at the upper portion of the power plant 1 by means of bolts. The bracket 36 is secured at an inner side surface 37 of a left side member 2 by means of bolts. Each of the shaft portion 32 of the supporting member 33 and the outer tube 34 has a shaft center extending in almost the vehicle width direction and the center point P of the shaft portion 32 within the outer tube 34 is positioned within the left side member 2.

Incidentally, 2' depicts a reinforcement attached to a surface inside the left side member 2.

Since each of a mount member 5 and a roll rod mount member 7 is the same as those of the conventional apparatus, the explanation thereof is omitted.

In the mount member 30 of this power plant mounting apparatus, a load to be transmitted to the left side member 2 side from the power plant 1 side is buffered by the insulator 35 when transmitted from the supporting member 33 through the insulator 35, the outer tube 34 and the bracket 36 sequentially. Since the point of action of the load acting on the shaft portion 32 of the supporting member 33, that is, the center point P is positioned within the left side member 2, an offset distance D in the vehicle width direction between a sectional center point R of the left side member 2 and the center point P can be made shorter as compared with the case of the conventional apparatus.

Thus, a bending input force and a torsional input force acting on the left side member 2 through the mount member 30 due to the load from the power plant 1 can be more reduced as compared with the conventional apparatus. As a result, the supporting rigidity of the mount member 30 for supporting the power plant 1 can be enhanced, so that the transmission of vibration to the vehicle body and the generation of noise can be effectively suppressed.

Further, since the center point P of the load acting on the shaft portion 32 of the supporting member 33 is positioned within the left side member 2, the distance in the vehicle width direction between the power plant 1 and the left side member 2, that is, a required space therebetween can be made smaller. Thus, it becomes possible to make large the degree of freedom as to the setting position of the mount member 30. As a result, the mount member 30 can be easily disposed at the position within the engine compartment which is effective as to suppress the vibration and noise, etc.

Further, since the shaft portion 32 of the supporting member 33 is positioned within the left side member 2, the space within the left side member 2 which has not been used conventionally is used for disposing the mount member 30. Thus, the space within the engine compartment can be used more effectively.

Incidentally, the sectional center point R of the left side member 2 and the center point P of the load acting on the shaft portion 32 of the supporting member 33 may be made to coincide with each other so that the offset distance D becomes minimum. Further, known elastic member in which liquid is sealed may be used instead of the rubber-like elastic member as the insulator in the mount member.

Figure 3:
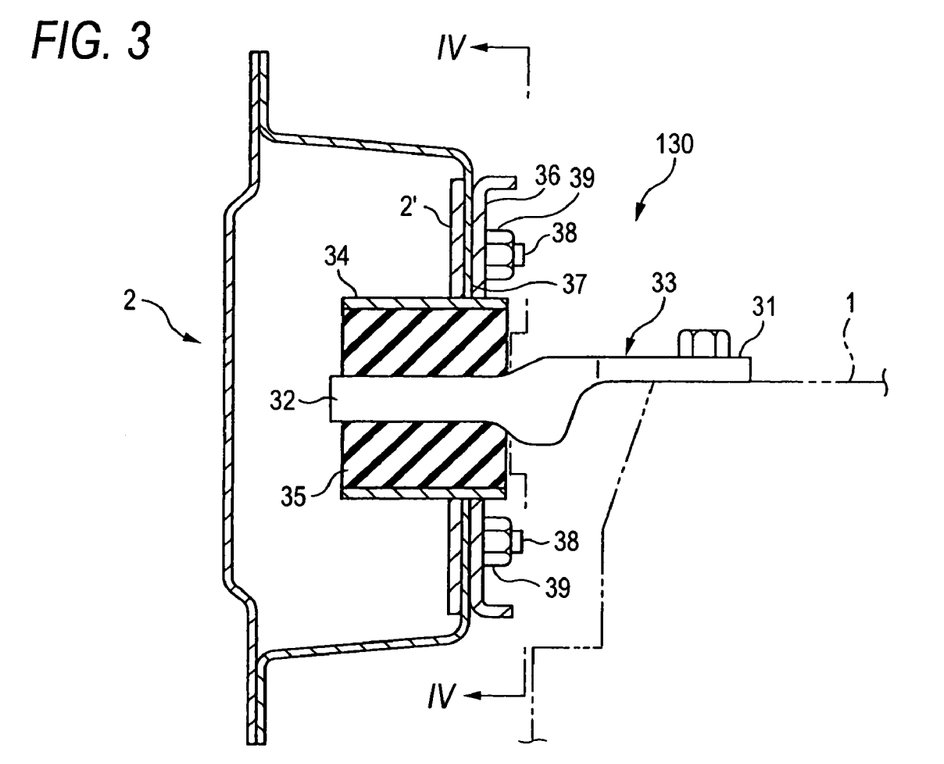
FIG. 3 is a sectional view showing a second embodiment of the present invention.
Figure 4:
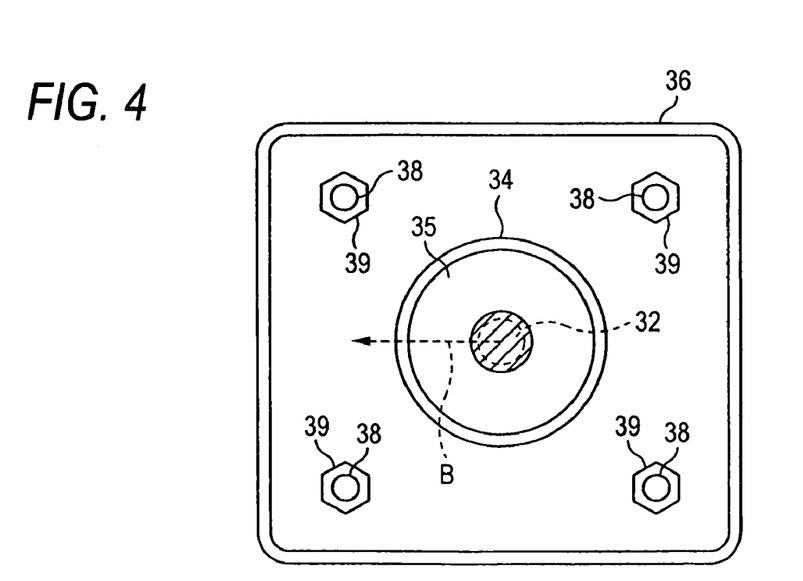
FIG. 4 is a sectional view taken along line IV—IV in FIG. 3.

A second embodiment of the invention will be described with reference to FIGS. 3 and 4. In these Figures, members and portions, which are the same as those in the first embodiment are denoted by the same reference numerals.

A mount member 130 includes a supporting member 33 having a flange 31 and a shaft portion 32 extending in the vehicle width direction, an outer tube 34 for surrounding the outer periphery of the shaft portion 32, an insulator 35 circularly disposed between the shaft portion 32 and the outer tube 34 and formed by rubber-like elastic member, and a bracket 36 of an almost flat plate-shape at which the outer tube 34 is fixed by means such as press fitting or welding. The flange 31 of the supporting member 33 is secured at the upper portion of the power plant 1 by means of bolts. The bracket 36 is secured at the inner side surface 37 of the left side member 2 by means of stud bolts 38 and nuts 39. Each of the shaft portion 32 and the outer tube 34 of the supporting member 33 has a shaft center extending in almost the vehicle width direction. Most portion of each of the shaft portion 32, the outer tube 34 and the insulator 35 is positioned within the left side member 2.

Incidentally, 2' depicts a reinforcement attached to a surface inside the left side member 2.

Since each of the mount member 5 and the roll rod mount member 7 is same as those of the conventional apparatus, the explanation thereof is omitted.

In the mount member 130 of this power plant mounting apparatus, most portion of each of the shaft portion 32 of the supporting member, the outer tube 34 and the insulator 35 is disposed within the left side member 2. Thus, as compared with the conventional apparatus in which the mount member 3 is provided at the inner side of the left side member 2, the distance in the vehicle width direction between the power plant 1 and the left side member 2, that is, a required space therebetween can be made small. Thus, it becomes possible to make large the degree of freedom as to the setting position of the mount member 130. As a result, the mount member 130 can be easily disposed at the position within the engine compartment which is effective as to suppress the vibration and noise, etc. Further, since the space within the left side member 2 which has not been used conventionally is used for disposing the mount member 130, the space within the engine compartment can be used more effectively.

Further, in the mount member 130, the shaft center of each of the shaft portion 32 of the supporting member 33 and the outer tube 34 extends in the vehicle width direction, and the insulator 35 is provided in an annular shape between the shaft portion 32 and the outer tube 34. Like the aforesaid conventional apparatus, the lower portion of the power plant 1 is coupled to the chassis cross member 6 with a sufficient intensity in the longitudinal direction of the vehicle by means of the roll rod mount 7. Thus, when a large roll input force acts on the power plant 1 as a reaction force of the wheels at the time of rapid acceleration of the vehicle, although a load is applied to the shaft portion 32 in the longitudinal direction of the vehicle as shown by an arrow B in FIG. 4, the load can be surely supported by the mount member 130. Accordingly, the power plant 1 can be always supported stably by the power plant mounting apparatus.

Furthermore, when the load in the longitudinal direction of the vehicle is applied to the shaft portion 32 of the mount member 130 due to the action of the roll input force, the insulator 35 disposed in the annular shape between the shaft portion 32 and the outer tube 34 can perform a stopper function for suppressing the interference between the shaft portion 32 and the outer tube 34. Thus, it becomes unnecessary to separately provide the stoppers 25, 25 of the conventional apparatus, and so the cost required for the mount member 130 can be reduced.

Of course, known elastic member in which liquid is sealed may be used instead of the rubber-like elastic member as the insulator in the mount member.

Figure 5:
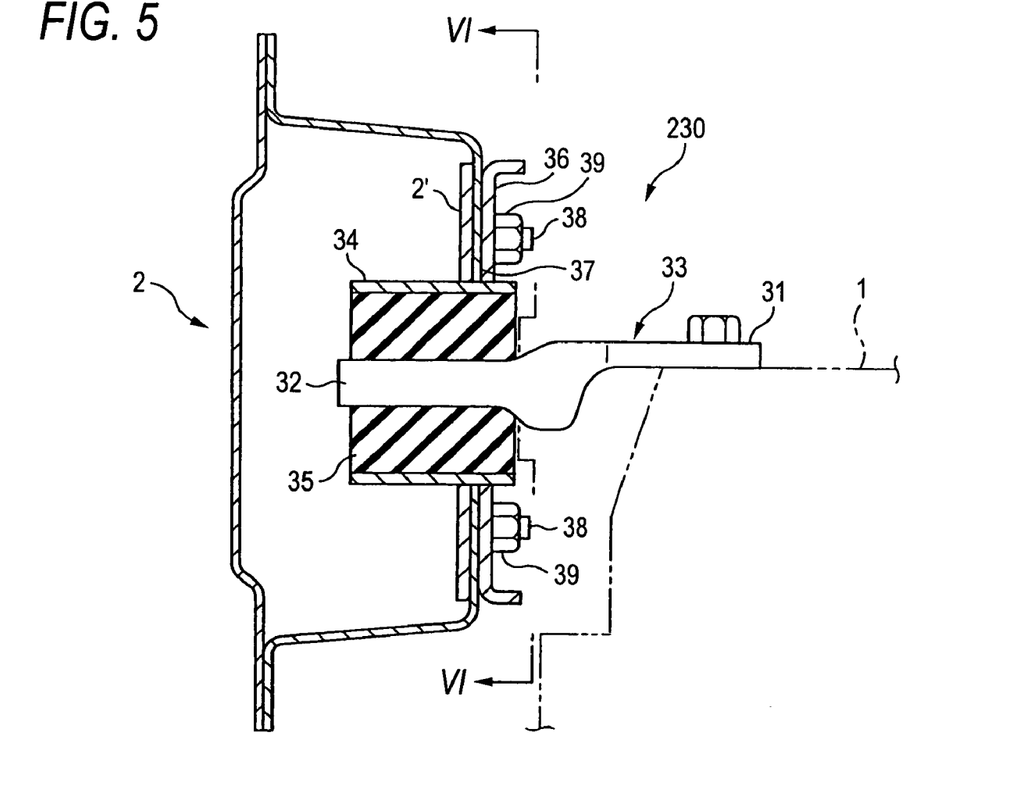
FIG. 5 is a sectional view showing a third embodiment of the present invention.
Figure 6:
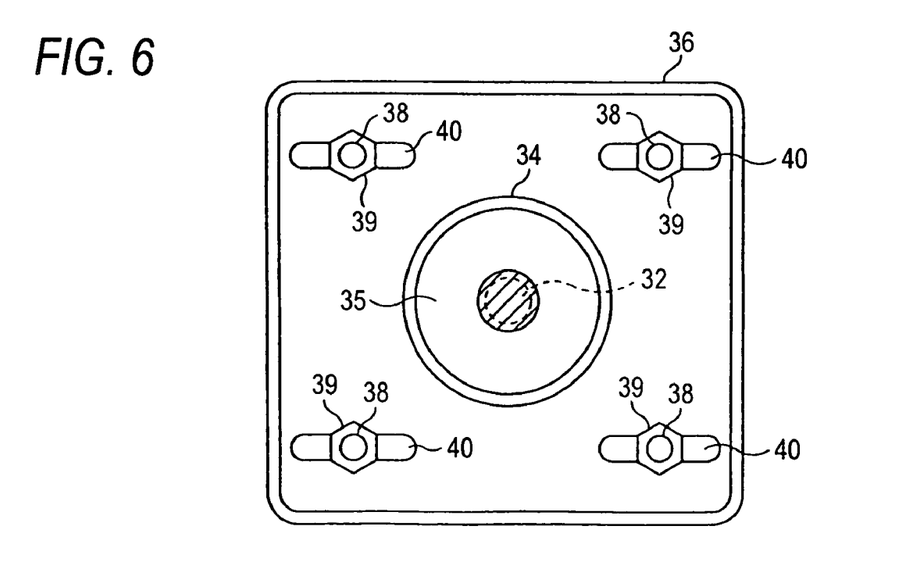
FIG. 6 is a sectional view taken along line VI—VI in FIG. 5.

A third embodiment of the invention will be described with reference to FIGS. 5 and 6. In these Figures, members and portions, which are the same as those in the first embodiment are denoted by the same reference numerals.

A mount member 230 includes a supporting member 33 having an arm 31 and a shaft portion 32 extending in the vehicle width direction, an outer tube 34 for surrounding the outer periphery of the shaft portion 32, an insulator 35 circularly disposed between the shaft portion 32 and the outer tube 34 and formed by rubber-like elastic member, and a flange portion 36 of an almost flat plate-shape at which the outer tube 34 is integrally fixed by means such as press fitting or welding. The arm 31 of the supporting member 33 is secured at the upper portion of the power plant 1 by means of bolts. Four stud bolts 38 fixed at the inner side surface 37 of the left side member 2 are respectively inserted through long holes 40 formed at the flange portion 36 and fastened by nuts 39, whereby the flange portion 36 is fixed at the inner side surface 37 of the left side member 2. Each of the shaft portion 32 and the outer tube 34 of the supporting member 33 has a shaft center extending in almost the vehicle width direction. Most portion of each of the shaft portion 32, the outer tube 34 and the insulator 35 is positioned within the left side member 2. Further, each of the long holes 40 extends substantially straight in the longitudinal direction of the vehicle.

Incidentally, 2' depicts a reinforcement attached to an surface inside the left side member 2.

Since each of the mount member 5 and the roll rod mount member 7 is same as those of the conventional apparatus, the explanation thereof is omitted.

In the mount member 230 of this power plant mounting apparatus, most portion of each of the shaft portion 32 of the supporting member, the outer tube 34 and the insulator 35 is disposed within the left side member 2. Thus, as compared with the conventional apparatus in which the mount member 3 is provided at the inner side of the left side member 2, the distance in the vehicle width direction between the power plant 1 and the left side member 2, that is, a required space therebetween can be made small. Thus, it becomes possible to make large the degree of freedom as to the setting position of the mount member 230.

Further, the outer tube 34 of the mount member 230 is fixed to the inner side surface 37 of the left side member 2 by means of the stud bolts 38 and the nuts 39 passing through the long holes 40 of the flange portion 36. Thus, the attachment position of the mount member 230 with respect to the left side member 2 can be easily changed by suitably shifting the stud bolts 38 along the long holes 40 in the longitudinal direction of the vehicle.

Thus, in the case where the specification of the power plant 1 differs and the attachment position of the mount member 230 to the left side member 2 capable of effectively reducing the vibration and noise caused by the operation of the power plant 1 shifts slightly in the longitudinal direction of the vehicle, the attachment position of the mount member 230 to the left side member 2 can be easily changed in the longitudinal direction of the vehicle. Thus, the degree of such a necessity for preparing many kinds of the left side members 2 respectively having different fixing positions of the stud bolts 38 in accordance with the change of the specification of the power plant 1, can be reduced. Therefore, it becomes possible to easily reduce the cost of the left side member 2.

Further, since the space within the left side member 2 which has not been used conventionally is used for disposing the mount member 230, the space within the engine compartment can be used more effectively.

Figure 10:
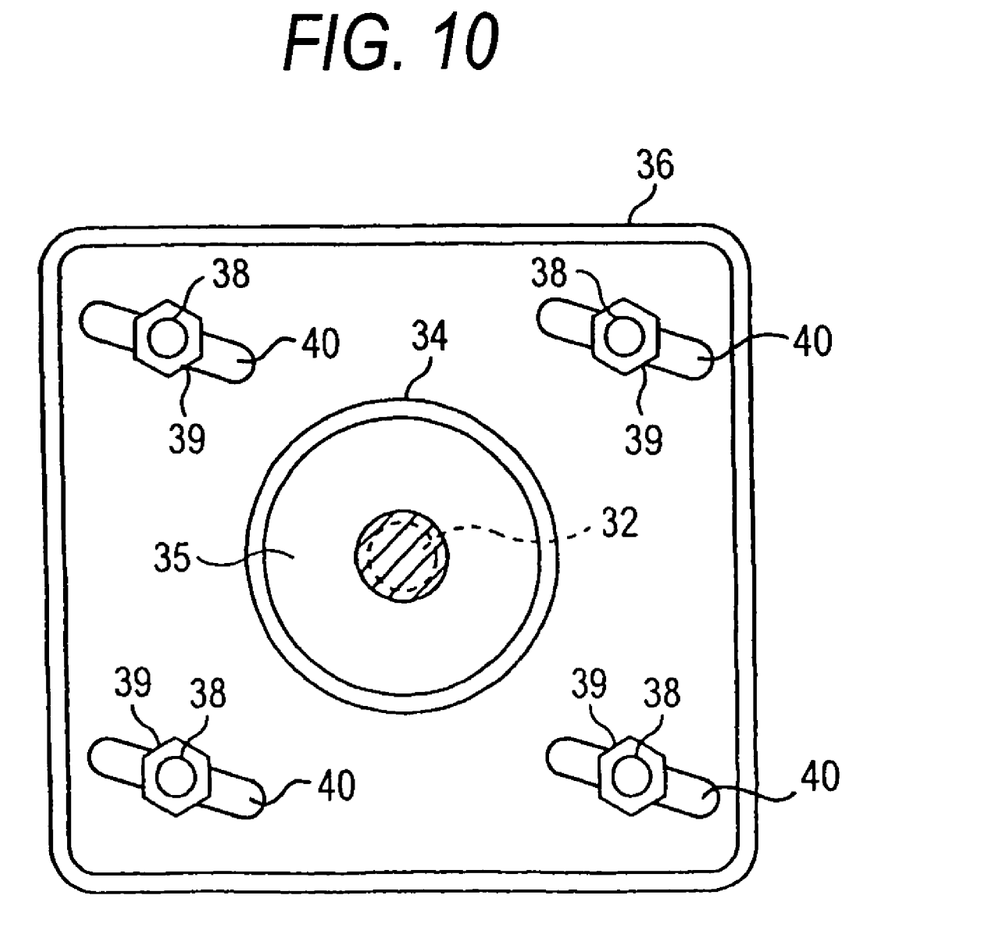
FIG. 10 is a sectional view similar to FIG. 6 but having slanted long holes.

Although in the aforesaid embodiment, each of the long holes 40 of the flange portion 36 extends linearly in the longitudinal direction of the vehicle, the action and effects similar to those of the aforesaid embodiment can be attained when each of the long holes is arranged to extend in a suitably slanted manner linearly, as shown in FIG. 10, or in a gentle arc-shape in the longitudinal direction of the vehicle. Further, known elastic member in which liquid is sealed may be used instead of the rubber-like elastic member as the insulator in the mount member.

As was described above, according to the first aspect of the invention, in the mount member disposed so as to cross between the power plant and the vehicle frame member, the center of a load acting on the vehicle frame member from the power plant is positioned within the vehicle frame member. Thus, the offset distance between the center of the load and the center of the vehicle frame member can be made shorter easily as compared with the conventional apparatus. As a result, the supporting rigidity of the mount member for supporting the power plant can be enhanced, so that the transmission of vibration to the vehicle body and the generation of noise can be effectively suppressed. Further, the space necessary between the power plant and the vehicle frame member can be made relatively small, so that the degree of freedom as to the setting position of the mount member can be made easily large. Thus, the mount member can be likely disposed at a suitable position.

According to the invention, at least a part of the shaft member and the outer tube of the mount member is disposed within the side member. Thus, the space required for disposing the mount member between the power plant and the side member can be made relatively small. Thus, the degree of freedom as to the setting position of the mount member can be made easily large. Therefore, the mount member can be likely disposed at a suitable position. Further, the shaft center of each of the shaft portion and the outer tube of the mount member is configured to extend in almost the vehicle width direction, and the load in the longitudinal direction of the vehicle applied to the mount member due to the roll input force acting on the power plant can be surely supported by the mount member. Accordingly, the power plant can be always supported stably by the power plant mounting apparatus.

According to the invention, at least a part of the shaft member and the outer tube of the mount member is disposed within the side member, and so the space required for disposing the mount member between the power plant and the side member can be made relatively small. Thus, the degree of freedom as to the setting position of the mount member can be made easily large. Thus, the mount member can be likely disposed at a suitable position. Further, the flange portion is fixed to the side member by means of the bolts that penetrate through the long holes of the flange portion that are integrally formed with the outer tube. Thus, the attachment position of the mount member with respect to the side member can be easily and suitably changed by relatively shifting the bolts within the long holes. Accordingly, the vibration, etc., of the power plant can be effectively reduced by the mount member. Further, the degree of such a necessity for preparing many kinds of the side members respectively having different fixing positions of the mount members in accordance with the change of the specification of the power plant, can be reduced.

What is claimed is:

1. A power plant mounting apparatus, comprising:
    a vehicle frame member having a closed cross section and constituting a vehicle frame;
    a mount member having,
        an outer tube supported only by a single wall of the vehicle frame member,
        a supporting member having a shaft portion extending inside the outer tube to an inside of the vehicle frame member, and a flange extending in a direction away from the outer tube and adapted to be attached directly to the power plant, and
        an elastic member provided between the shaft portion and the outer tube,
    wherein at least a part of the mount member is positioned inside the vehicle frame member.

2. The power plant mounting apparatus according to claim 1, wherein a point of action of a load exerted on the mount member is positioned within the vehicle frame member.

3. The power plant mounting apparatus according to claim 2, wherein the vehicle frame member comprises a side member extending in a longitudinal direction of a vehicle.

4. The power plant mounting apparatus according to claim 3, wherein the elastic member is disposed in an annular manner between the shaft portion and the outer tube.

5. The power plant mounting apparatus according to claim 4, wherein when the load is exerted on the shaft member, a center point of the shaft portion within the outer tube serves as the point of action of the load.

6. The power plant mounting apparatus according to claim 5, further comprising:
    a roll rod mount member that enables a chassis cross member disposed at a rear side portion of the vehicle to support the power plant,
    wherein both end portions in a vehicle width direction of the power plant are supported by left and right side members, and at least one end portion of the power plant is supported by the side member via the mount member.

7. The power plant mounting apparatus according to claim 1, wherein the vehicle frame member comprises a side member extending in a longitudinal direction of a vehicle;
    the elastic member is disposed in an annular manner between the shaft portion and the outer tube; and
    a shaft center of each of the shaft portion and the outer tube substantially extends in a vehicle width direction.

8. The power plant mounting apparatus according to claim 7, wherein the mount member is coupled to an upper portion of the power plant.

9. The power plant mounting apparatus according to claim 8, further comprising:

a second mount member that enables a side member opposite to the side member to which the mount member is connecting the power plant to elastically support the power plant; and a roll rod mount member that enables a chassis cross member disposed at a rear side portion of the vehicle to support the power plant.

10. The power plant mounting apparatus according to claim 9, wherein each of the mount members is coupled to an upper portion of the power plant, and the roll rod mount member is coupled to a lower portion of the power plant.

11. The power plant mounting apparatus according to claim 1, wherein the vehicle frame member comprises a side member extending in a longitudinal direction of a vehicle;
a flange portion fixed to the outer tube has a long hole; and
the flange portion is fixed to the side member by a bolt penetrating through the long hole.

12. The power plant mounting apparatus according to claim 11, wherein the long hole substantially extends in the longitudinal direction of the vehicle.

13. The power plant mounting apparatus according to claim 12, wherein the bolt is a stud bolt fixed to the side member.

14. The power plant mounting apparatus according to claim 13, wherein the shaft portion is coupled to an upper portion of the power plant.

15. The power plant mounting apparatus according to claim 14, further comprising:
a second mount member that enables a side member opposite to the side member to which the mount member is connecting the power plant to elastically support the power plant; and
a roll rod mount member that enables a chassis cross member disposed at a rear side portion of the vehicle to support the power plant.

16. The power plant mounting apparatus according to claim 15, wherein the second mount member is coupled to the upper portion of the power plant, and the roll rod mount portion is coupled to a lower portion of the power plant.

17. The power plant mounting apparatus according to claim 11, wherein the long hole extends in a slanted manner with respect to a vertical direction or the longitudinal direction of the vehicle.

18. The power plant mounting apparatus according to claim 11, wherein the flange portion is fixed to a vertical wall of the side member.

19. The power plant mounting apparatus according to claim 1, wherein a length of the shaft portion is substantially the same as a length of the flange.

20. The power plant mounting apparatus according to claim 1, wherein the supporting member has, between the shaft portion and the flange, a portion having a diameter larger than the shaft portion.

21. The power plant mounting apparatus according to claim 1, wherein the flange is attached directly to the power plant by one of bolt and a nut.

* * * * *